(12) United States Patent
Matsuda et al.

(10) Patent No.: US 7,172,214 B2
(45) Date of Patent: Feb. 6, 2007

(54) GAS GENERATOR FOR AIR BAG

(75) Inventors: Naoki Matsuda, Himeji (JP);
Masayuki Yamazaki, Himeji (JP);
Yasunori Iwai, Shijyonawate (JP)

(73) Assignee: Daicel Chemical Industries, Ltd., Osaka (JP)

( * ) Notice: Subject to any disclaimer, the term of this patent is extended or adjusted under 35 U.S.C. 154(b) by 423 days.

(21) Appl. No.: 10/728,941

(22) Filed: Dec. 8, 2003

(65) Prior Publication Data

US 2004/0207188 A1    Oct. 21, 2004

Related U.S. Application Data

(60) Provisional application No. 60/520,244, filed on Nov. 17, 2003, provisional application No. 60/432,663, filed on Dec. 12, 2002.

(30) Foreign Application Priority Data

Dec. 9, 2002   (JP) ............................. 2002-356704
Nov. 12, 2003  (JP) ............................. 2003-382436

(51) Int. Cl.
*B60R 21/26* (2006.01)
(52) U.S. Cl. .................................... 280/741
(58) Field of Classification Search ................ 280/741, 280/736, 740, 742
See application file for complete search history.

(56) References Cited

U.S. PATENT DOCUMENTS

| | | | |
|---|---|---|---|
| 5,100,174 A | | 3/1992 | Jasken et al. |
| 5,149,129 A | | 9/1992 | Unterforsthuber et al. |
| 5,200,574 A | | 4/1993 | Cunningham et al. |
| 6,053,531 A | * | 4/2000 | Katsuda et al. ............. 280/741 |
| 6,129,381 A | * | 10/2000 | Katsuda et al. ............. 280/741 |
| 6,135,496 A | * | 10/2000 | Katsuda et al. ............. 280/736 |
| 6,170,869 B1 | * | 1/2001 | Tomiyama .................. 280/741 |
| 6,183,006 B1 | * | 2/2001 | Katsuda et al. ............. 280/736 |
| 6,196,581 B1 | | 3/2001 | Katsuda et al. |
| 6,224,096 B1 | * | 5/2001 | Katsuda et al. ............. 280/736 |
| 6,224,098 B1 | * | 5/2001 | Katsuda et al. ............. 280/741 |
| 6,231,080 B1 | * | 5/2001 | Katsuda et al. ............. 280/741 |
| 6,364,354 B1 | * | 4/2002 | Nakashima et al. ........ 280/736 |
| 6,378,901 B1 | * | 4/2002 | Yamazaki et al. .......... 280/741 |
| 6,386,582 B2 | * | 5/2002 | Katsuda et al. ............. 280/736 |
| 6,406,060 B1 | * | 6/2002 | Katsuda et al. ............. 280/736 |
| 6,412,815 B1 | * | 7/2002 | Nakashima et al. ........ 280/736 |
| 6,460,883 B1 | * | 10/2002 | Nakashima et al. ........ 280/736 |
| 6,460,884 B1 | * | 10/2002 | Nakashima et al. ........ 280/741 |

(Continued)

FOREIGN PATENT DOCUMENTS

DE    3921472 C1   11/1990

(Continued)

*Primary Examiner*—Faye M. Fleming
(74) *Attorney, Agent, or Firm*—Birch, Stewart, Kolasch & Birch, LLP

(57) ABSTRACT

A gas generator for an air bag includes a filter having excellent cooling effect. A gas flow as illustrated in the drawings is formed by effect of the inner cylindrical shielding plate 66, the outer cylindrical shielding plate 67, the first gap 71 and the second gap 72, which sandwich a cylindrical filter 65 for cooling a combustion gas from the both side. Thus, the cooling effect of the combustion gas is enhanced.

14 Claims, 7 Drawing Sheets

U.S. PATENT DOCUMENTS 6,557,888 B1 * 5/2003 Nakashima et al. ........ 280/735
2002/0017778 A1 2/2002 Katsuda et al.

FOREIGN PATENT DOCUMENTS

| DE | 3921473 C1 | 11/1990 |
|---|---|---|
| EP | 0773146 | 5/1997 |
| EP | 0857627 A1 | 8/1998 |
| EP | 0864553 A1 | 9/1998 |
| JP | 6-67711 B2 | 8/1994 |
| JP | 9-66795 A | 3/1997 |
| JP | 2001-97172 A | 4/2001 |
| JP | 2002-46569 A | 2/2002 |

* cited by examiner

GAS GENERATOR FOR AIR BAG

CROSS-REFERENCE TO RELATED APPLICATIONS

This Nonprovisional application claims priority under 35 U.S.C. § 119(e) on U.S. Provisional Application Nos. 60/432,663 and 60/520,244 filed on Dec. 12, 2002 and Nov. 17, 2003 and under 35 U.S.C. § 119(a) on Patent Application Nos. 2002-356704 and 2003-382436 filed in Japan on Dec. 9, 2002 and Nov. 12, 2003, the entire contents of which are hereby incorporated by reference.

BACKGROUND OF THE INVENTION

1. Field of the Invention

The present invention relates to a gas generator for an air bag for protecting a passenger from an impact.

2. Description of Related Art

A gas generator for an air bag incorporated in an air bag system mounted in an automobile needs to satisfy various requirements in view of protection of a passenger. For example, the gas generator is required to reliably operate even after ten years which correspond to normal service life of a vehicle mounted with the gas generator. Further, when the air bag is inflated and developed, it is required that the air bag is not heated excessively, combustion residue (soot) is not mixed into the air bag, and the passenger does not feel nervous or does not receive physical influence.

A coolant/filter is disposed in the gas generator to cool a high temperature combustion gas generated by combustion of a gas generating agent or collect the combustion residue. In order to reduce the gas generator in both size and weight, it is required to lighten the coolant/filter without deteriorating the cooling effect.

Further, a gas generating agent used for the gas generator does not always have high ignitability depending upon its composition. Even such a gas generating agent, it is required to start igniting and to complete ignition within a predetermined period of time, and to introduce a gas into the air bag so that a passenger is restrained at the time of collision.

Besides, in the operation process of the gas generator, if a portion of the gas generator where ignition energy from ignition means is transmitted to the gas generating agent and a portion of the gas generator where a gas generated by the combustion is discharged from the combustion chamber are close to each other, it is considered that a portion of the ignition energy is discharged from the combustion chamber as it is, or the ignition energy is transmitted to the entire gas generating agent in the combustion chamber and a portion of the gas generating agent is remained unburnt. In such a case, there is an adverse possibility that the air bag cannot sufficiently be inflated and developed.

U.S. Pat. No. 5,200,574 is prior art related to the present invention.

SUMMARY OF THE INVENTION

It is an object of the present invention to provide a gas generator for an air bag having a structure in which the gas generator is reduced in both size and weight, the cooling effect of a coolant/filter or the like is enhanced, and the ignitability of the gas generating agent is enhanced.

As means for solving the problem, one aspect of the invention provides a gas generator for an air bag comprising a housing having a gas discharge port, an ignition means chamber accommodating therein ignition means which is activated by an impact, and a combustion chamber accommodating therein a gas generating agent which is ignited and burnt to generate a combustion gas, a cylindrical filter disposed between the combustion chamber and the gas discharge port, and in which the combustion gas passes through the filter and is discharged from the gas discharge port, wherein an inner cylindrical shielding plate is disposed inside the cylindrical filter, the inner cylindrical shielding plate is disposed such that its lower end opening peripheral edge comes into contact with a housing bottom surface and a space is formed between an upper end opening peripheral edge of the inner cylindrical shielding plate and a housing ceiling surface, a portion having excellent air permeability is provided between an inner peripheral surface of the cylindrical filter and the inner cylindrical shielding plate.

Since heat resistance is required for the inner cylindrical shielding plate, it is made of metal such as stainless metal.

When the ignition means is activated, the ignition energy (flame, high temperature combustion gas or the like) is discharged into the combustion chamber, and the gas generating agent is ignited and burnt. At that time, since the ignition energy intensively collides against the cylindrical filter (coolant/filter) portion existing in the advancing direction of the ignition energy, this portion of the cylindrical filter is largely damaged in some cases. Further, since the combustion gas generated by combustion of the gas generating agent passes through the cylindrical filter in its widthwise direction, the cooling and filtering (filtering of combustion residue) time becomes only the passing time in the widthwise direction.

Thereupon, if the inner cylindrical shielding plate is disposed, the ignition energy collides against the inner cylindrical shielding plate, the ignition energy is prevented from intensively colliding against only one portion of the cylindrical filter.

Further, since a portion having excellent air permeability is provided between an inner peripheral surface of the cylindrical filter and the inner cylindrical shielding plate, a portion of the combustion gas passes through the entire region of the cylindrical filter in the axial direction and the widthwise direction, and the cooling and filtering effects are enhanced and the mass of the cylindrical filter can be reduced correspondingly.

The inner cylindrical shielding plate exhibits the following effect at the same time. That is, when no inner cylindrical shielding plate exists and a large amount of gas generating agent exists in a direction other than the discharging direction of the ignition energy into the combustion chamber, the gas generating agent existing in that direction is less prone to be ignited. Thereupon, the inner cylindrical shielding plate is disposed such that the ignition energy collides against the inner cylindrical shielding plate, the advancing direction of the ignition energy is changed and thus, the ignitability and flammability of the entire gas generating agent charged into the combustion chamber are enhanced. Especially when the gas generating agent has low ignitability, this structure is preferable.

As another solving means, the second aspect of the present invention provides a gas generator for an air bag comprising a housing having a gas discharge port, an ignition means chamber accommodating therein ignition means which is activated by an impact, and a combustion chamber accommodating therein a gas generating agent which is ignited and burnt to generate a combustion gas, a cylindrical filter disposed between the combustion chamber and the a gas discharge port, in which the combustion gas passes through the filter and is discharged from the gas discharge port, wherein an inner cylindrical shielding plate and an outer cylindrical shielding plate are respectively disposed inside and outside the cylindrical filter, the inner cylindrical shielding plate is disposed such that its lower end opening peripheral edge comes into contact with a housing bottom surface and a space is formed between an upper end opening peripheral edge of the inner cylindrical shielding plate and a housing ceiling surface, a portion having excellent air permeability is provided between an inner peripheral surface of the cylindrical filter and the inner cylindrical shielding plate, the outer cylindrical shielding plate is disposed such that its upper end opening peripheral edge comes into contact with the housing ceiling surface, a space is provided between the housing bottom surface and a lower end opening peripheral edge of the outer cylindrical shielding plate, and a gap is generated between the outer cylindrical shielding plate and a housing peripheral wall having the a gas discharge port.

By providing the inner cylindrical shielding plate and the outer cylindrical shielding plate in combination in this manner, the effect obtained by the first aspect of the present invention is further enhanced. Especially, since the inner cylindrical shielding plate and the outer cylindrical shielding plate are disposed, the combustion gas is allowed to flow forcibly in the axial direction of the cylindrical filter and thus, the contact time between the combustion gas and the cylindrical filter becomes long, the combustion gas can flow through the entire region of the cylindrical filter in the axial direction and the widthwise direction, the cooling and filtering effects are enhanced. Thus, the thickness of the cylindrical filter or the like can be reduced, and the mass of the cylindrical filter can be reduced.

In the third aspect of the invention, the gas generator for an air bag according to first and second aspects of the invention, the lower end opening peripheral edge of the inner cylindrical shielding plate may come into contact with the housing bottom surface, the upper end opening peripheral edge of the inner cylindrical shielding plate may come into contact with the housing ceiling surface, the upper end opening peripheral edge side of the inner cylindrical shielding plate may have a vent hole, a portion having excellent air permeability is provided between an inner peripheral surface of the cylindrical filter and the inner cylindrical shielding plate.

In the first aspect of the invention, a space may be provided between the upper end opening peripheral edge of the inner cylindrical shielding plate and the housing ceiling surface, the combustion gas passes through the gap and moves toward the cylindrical filter. Whereas, according to the third aspect of the invention, the entire surface of the inner peripheral surface of the cylindrical filter may be covered with the inner cylindrical shielding plate, and the vent hole may be provided in a portion corresponding to the space in the first aspect of the invention.

In the fourth aspect of the invention, the gas generator for an air bag according to the second and third aspects of the invention, the outer cylindrical shielding plate may be disposed such that its upper end opening peripheral edge comes into contact with the housing ceiling surface and the lower end opening peripheral edge of the outer cylindrical shielding plate comes into contact with the housing bottom surface, the lower end opening peripheral edge side of the outer cylindrical shielding plate has a vent hole, and a gap is generated between the housing peripheral wall having the a gas discharge port and the outer cylindrical shielding plate.

In the second aspects of the invention, a space may be provided between the housing bottom surface and the lower end opening peripheral edge of the outer cylindrical shielding plate, the combustion gas reaches the gas discharge port through the space. Whereas, in the fourth aspect of the invention, the entire surface of the outer peripheral surface of the cylindrical filter may be covered by the outer cylindrical shielding plate, and the vent hole may be provided in the portion corresponding to the space in the second aspect of the invention.

The fifth aspect of the invention provides a gas generator for an air bag comprising a housing having a gas discharge port, an ignition means chamber accommodating therein ignition means which is activated by an impact, and a combustion chamber accommodating therein a gas generating agent which is ignited and burnt to generate a combustion gas, a cylindrical filter disposed between the combustion chamber and the gas discharge port, in which the combustion gas passes through the filter and is discharged from the gas discharge port, wherein an inner space of an inner cylinder disposed in a central portion of the housing forms an ignition means chamber, the ignition means chamber and the combustion chamber are in communication with each other through the communication hole formed in a peripheral wall of the inner cylinder, an inner cylindrical shielding plate is disposed inside the cylindrical filter, an upper end opening peripheral edge of the inner cylindrical shielding plate comes into contact with a housing ceiling surface and a combustion gas can pass between the lower end opening peripheral edge and a housing bottom surface, or the lower end opening peripheral edge of the inner cylindrical shielding plate comes into contact with the housing bottom surface and the combustion gas can pass between the upper end opening peripheral edge and the housing ceiling surface, a portion having excellent air permeability is provided between an inner peripheral surface of the cylindrical filter and the inner cylindrical shielding plate, a communication hole formed in the peripheral wall of the inner cylinder is provided at the position opposite to the inner cylindrical shielding plate.

When the ignition means chamber and the combustion chamber are in communication with each other through the communication hole provided in the peripheral wall of the inner cylinder, a portion where the ignition energy collides against the cylindrical filter is different depending upon the forming position of the communication hole which becomes a passage through which the ignition energy (high temperature gas, flame or the like) is discharged toward the combustion chamber. When the communication hole partially exists in the inner cylinder, the ignition energy amount which collides against the cylindrical filter is increased. Further, if the diameter of the communication hole is small or the number of communication holes is small, the flow rate of the ignition energy discharged from the communication holes becomes fast and thus, the ignition energy collides against a portion of the cylindrical filter.

Therefore, in accordance with a position of the communication hole, when the inner cylindrical shielding plate is extended downward or upward from the housing ceiling surface or housing bottom surface and the inner cylindrical shielding plate is disposed to face the communication hole, the ignition energy discharged from the communication hole toward the combustion chamber absolutely collides against the inner cylindrical shielding plate. Thus, the ignition energy is prevented from intensively colliding against the portion of the cylindrical filter irrespective of the position of the communication hole, a size of the communication hole and the number of communication holes or the like and thus, the filter is not damaged. Like in the first aspect of the invention, the cooling and filtering effects by the cylindrical filter are enhanced, and ignitability of the gas generating agent in the combustion chamber is enhanced. This structure is preferable when a gas generating agent having low ignitability is to be burnt.

As to the sixth aspect of the invention, in the gas generator for an air bag of the invention according to the fifth aspect of the invention, when an upper end opening peripheral edge of the inner cylindrical shielding plate comes into contact with a housing ceiling surface and a space is formed between the lower end opening peripheral edge and the housing bottom surface or when the upper end opening peripheral edge of the inner cylindrical shielding plate comes into contact with the housing ceiling surface and the lower end opening peripheral edge comes into contact with the housing bottom surface and a plurality of vent holes are formed in the lower end opening peripheral edge, a relationship between a position of a communication hole, which is formed in the peripheral wall of the inner cylinder, in the axial direction of the housing and a position of a tip end of the inner cylindrical shielding plate or a forming position of the vent hole may be set such that if a height from the housing ceiling surface to the housing bottom surface is defined as L, the communication hole may be formed in a peripheral wall of the inner cylinder in the range of 0.05 L to 0.6 L from the housing ceiling surface, the position of the tip end of the inner cylindrical shielding plate or the forming position of the vent hole may exist in the range of 0.3 L to 0.8 L from the housing ceiling surface, and the communication hole and the inner cylindrical shielding plate may be exactly opposite to each other.

The position of the communication hole may be determined based on the center of the communication hole. Since the communication hole has a small diameter (e.g., 1 to 4 mm), even if the position is determined based on the center of the hole, the effect of the invention is not deteriorated. When a plurality of communication holes are arranged in the axial direction, the communication hole which is the closest to the housing bottom surface is the reference.

The position of the vent hole may be determined based on the lower end of the vent hole and may be at a position where the communication hole and the vent hole are not exactly opposite to each other (communication hole is exactly opposite to a portion of the plate where no vent hole is formed).

This invention provides the means for more reliably exhibiting the effect of the invention according to the fifth aspect of the invention, and the adjusting ranges of the forming position of the communication hole and the position of the tip end of the inner cylindrical shielding plate (when there exists the vent hole, the position of the vent hole) are determined.

The positional relationship can appropriately be adjusted such that the respective elements are in the above ranges, and the communication hole and the inner cylindrical shielding plate are exactly opposite to each other. For example, when the forming position of the communication hole is 0.05 L, the position of the tip end of the shielding plate can be 0.3 L, and when the forming position of the vent hole is 0.6 L, the position of the tip end of the shielding plate can be 0.8 L.

As to the seventh aspect of the invention, in the gas generator for an air bag of the invention according to the fifth aspect of the invention, when the lower end opening peripheral edge of the inner cylindrical shielding plate comes into contact with the housing bottom surface and a space is generated between the housing ceiling surface and the upper end opening peripheral edge of the inner cylindrical shielding plate, or when the lower end opening peripheral edge of the inner cylindrical shielding plate comes into contact with the housing bottom surface and the upper end opening peripheral edge of the inner cylindrical shielding plate comes into contact with the housing ceiling surface and a plurality of vent holes are formed in the upper end opening peripheral edge, a relationship between a forming position of the communication hole, which is formed in the peripheral wall of the inner cylinder, in the axial direction of the housing and a position of the tip end of the inner cylindrical shielding plate or the forming position of the vent hole may be set such that if a height from the housing bottom surface to the housing ceiling surface is defined as L, the communication hole may be formed in the inner cylinder peripheral wall in the range of 0.05 L to 0.6 L from the housing bottom surface, the position of the tip end of the inner cylindrical shielding plate or the forming position of the vent hole may exist in the range of 0.3 L to 0.8 L from the housing bottom surface, the communication hole and the inner cylindrical shielding plate may be exactly opposite to each other.

The position of the communication hole may be determined based on the center of the communication hole. Since the diameter of the communication hole is small (e.g., 1 to 4 mm), even if the position is determined based on the center of the hole, the effect of the invention is not deteriorated. When a plurality of communication holes are arranged in the axial direction, the communication hole which is the closest to the housing ceiling surface is the reference.

The position of the vent hole may be determined based on the upper end and may be at a position where the communication hole and the vent hole are not exactly opposite to each other (communication hole is exactly opposite to a portion of the plate where no vent hole is formed).

This invention more reliably exhibits the effect of the fifth aspect of the invention by solving means similar to the sixth aspect of the invention.

As to the eighth aspect of the invention, in the gas generator for an air bag of any one of the first to seventh aspects of the invention, the inner cylindrical shielding plate may comprise an annular bottom surface and an annular peripheral wall provided vertically with the annular bottom surface, a diameter of the annular bottom surface may be set greater than a diameter of the annular bottom surface, the annular bottom surface may come into contact with the housing ceiling surface or the housing bottom surface, an inner peripheral edge of the annular bottom surface may abut against the inner cylinder peripheral wall or an outer peripheral edge of the annular bottom surface may abut against an inner peripheral surface of the cylindrical filter.

The width of the annular bottom surface (difference between the outer diameter and the inner diameter of the annular bottom surface) and a difference between the inner diameter of the cylindrical filter and the outer diameter of the inner cylinder can be about the same. In this case, the inner peripheral edge of the annular bottom surface abuts against the outer peripheral wall of the inner cylinder, and the outer peripheral edge of the annular bottom surface abuts against the inner peripheral surface of the cylindrical filter.

By using the inner cylindrical shielding plate having such annular bottom surface and annular peripheral wall, the positioning between the inner cylinder and the cylindrical filter becomes easy, and since a space is provided between the inner cylindrical shielding plate and the cylindrical filter, the portion having excellent air permeability can easily be formed.

As to the ninth aspect of the invention, in the gas generator for an air bag of any one of the fifth to eight aspects of the invention, an outer cylindrical shielding plate may be further disposed outside the cylindrical filter, one end opening peripheral edge of the outer cylindrical shielding plate may come into contact with the housing ceiling surface or the housing bottom surface, the other end opening peripheral edge may be disposed at a distance from the housing bottom surface or the housing ceiling surface, and also a gap may be generated between the outer cylindrical shielding plate and the housing peripheral wall having the a gas discharge port.

This invention exhibits the same effect as that of the second aspect of the invention, the outer cylindrical shielding plate may be used in combination with the inner cylindrical shielding plate, and when the inner cylindrical shielding plate may be mounted such that it extends from the housing ceiling surface downward, the outer cylindrical shielding plate is upwardly extended from the housing bottom surface and mounted. When the mounting method of the inner cylindrical shielding plate is opposite, the outer cylindrical shielding plate is mounted also in an opposite manner.

As to the tenth aspect of the invention, in the gas generator for an air bag of any one of the fifth to eighth aspects of the invention, an outer cylindrical shielding plate may be further disposed outside the cylindrical filter, one end opening peripheral edge of the outer cylindrical shielding plate may come into contact with the housing ceiling surface or the housing bottom surface, the other end opening peripheral edge of the outer cylindrical shielding plate may come into contact with the housing bottom surface or the housing ceiling surface, the other end opening peripheral edge may have a vent hole, a gap may be generated between the outer cylindrical shielding plate and the housing peripheral wall may have the a gas discharge port.

The structure of this invention is different from that of the eighth aspect of the invention only in the outer cylindrical shielding plate, and exhibits the same effect as that of the second aspect of the invention.

As to the eleventh aspect of the invention, in the gas generator for an air bag of any one of the above aspects of the invention, a portion having excellent air permeability provided between an inner peripheral surface of the cylindrical filter and an inner cylindrical shielding plate may be a cylindrical space provided between the inner peripheral surface of the cylindrical filter and the inner cylindrical shielding plate or a coarse structure of the cylindrical filter.

As to the twelfth aspect of the invention, in the gas generator for an air bag of any one of the aspects of the first to eleventh aspects of the invention, a bulk density of the cylindrical filter may be 1 to 5 g/cm$^3$, and a thickness of the cylindrical filter may be 3 to 10 mm.

As to the thirteenth aspect of the invention, in the gas generator for an air bag of any one of the first to twelfth aspects of the invention, a width of the portion having excellent air permeability provided between a surface of the cylindrical filter and the inner cylindrical shielding plate may be 0.5 to 3 mm.

According to the fourteenth aspect of the present invention, in the gas generator for an air bag of any one of the above inventions, the ignition means an electric igniter which is activated by igniting current and a transfer charge which is ignited by activation of the electric igniter, a gas generating agent having a combustion temperature of 1000 to 3000° C. is used as the transfer charge, and a gas generating agent having a combustion temperature of 1000 to 1700° C. is used as the gas generating agent for inflating the air bag, which is disposed in the combustion chamber.

As a priming of the electric igniter used in the ignition means, ZPP (zirconium and potassium perchlarate; ZPP is 90 to 300 g) is known. A gas generating agent having composition using nitroguanidine as fuel and using strontium nitrate as oxidizer can be used as the gas generating agent (gas generating agent 1) having a combustion temperature of 1700 to 3000° C. This gas generating agent has excellent ignitability, and can be ignited and burnt directly by an igniter including ZPP of the above amount. At that time, if the gas generating agent 1 is of a cylindrical shape having a single through-hole or many through-holes, or of a cylindrical shape having single or many hollows, or of a columnar pellet shape, the combustion completion time of the gas generating agent 1 can be adjusted.

As the gas generating agent having the combustion temperature of 1000 to 1700° C., a gas generating agent (gas generating agent 2) having composition using guanidine nitrate as fuel and using basic copper oxide as oxidizer can be used. Since this gas generating agent 2 is inferior to the gas generating agent 1 in ignitability, it is difficult to ignite and burn the gas generating agent 2 directly only by the igniter, but since the combustion temperature is low, a load to the coolant is small. Thus, the coolant can be simplified, and the size of the entire gas generator can be reduced. The poor ignitability of the gas generating agent 2 can be overcome by combining the gas generating agent 2 with the gas generating agent 1 having the combustion temperature of 1700 to 3000° C.

A boron niter is conventionally known as the transfer charge, but the boron niter is powder and the combustion is completed instantaneously. Thus, the boron niter is not suitable for igniting the gas generating agent having poor ignitability such as the gas generating agent 2. Hence, if the gas generating agent 1 which can maintain the combustion durability in some degree is used as the transfer charge by adjusting its shape or the like, the ignitability for the gas generating agent 2 can be enhanced. Further, since the transfer charge is also a gas generating agent, a gas generated by combustion of the transfer charge can be used as a gas for developing the air bag.

According to the gas generator for an air bag of the present invention, the gas generator can be reduced in both size and weight, and the cooling effect of the combustion gas and collecting effect of the combustion residue can be enhanced.

DETAILED DESCRIPTION OF THE INVENTION

(1) First Embodiment

Figure 1:
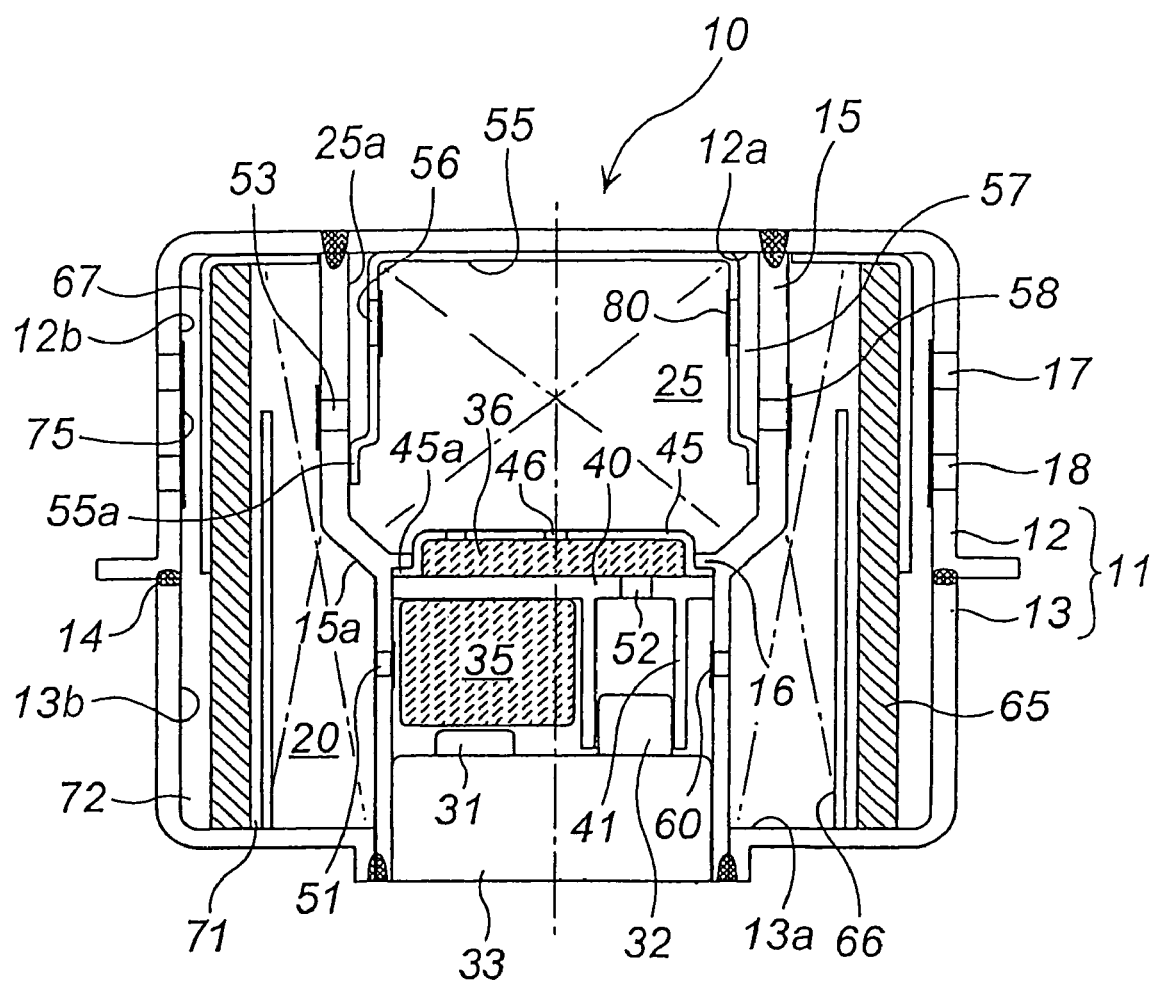
FIG. 1 is an axial sectional view of a gas generator for an air bag.

Embodiments of the present invention will be explained with reference to the drawings. FIG. 1 is an axial sectional view of a gas generator for an air bag according to the first embodiment of the present invention. In the following description, a vertical relationship such as "upper" or "lower" is indicated with reference to FIG. 1, "the axial direction" means the axial direction of a housing, and "the radial direction" means the radial direction of the housing.

In a gas generator 10, an outer shell container is formed of a housing 11. The housing 11 is formed by bonding a diffuser shell 12 to a closure shell 13. The diffuser shell 12 and the closure shell 13 form an inner accommodating space. The diffuser shell 12 and the closure shell 13 are welded to each other through welded portion 14. In FIG. 1, other shaded portions also indicate welded portions.

The diffuser shell 12 is provided with a necessary number of gas discharge ports 17 and 18. Diameters of the gas discharge ports 17 and 18 may be the same or different.

A substantially cylindrical inner cylinder 15 is disposed in the housing 11. An upper end edge of the inner cylinder 15 is joined to a ceiling surface 12a of the diffuser shell 12, a lower end edge of the inner cylinder 15 is joined to a bottom surface 13a of the closure shell 13, thereby separating inner and outer spaces from each other.

The inner cylinder 15 has an inclined wall portion 15a which is increased in diameter in the radial direction so that an inner diameter of an upper portion of the inner cylinder 15 (closer to the ceiling surface 12a) becomes larger than an inner diameter of a lower portion of the inner cylinder 15 (closer to the bottom surface 13a). It is preferable to set the shape of the inner cylinder 15 in this manner as shown in FIG. 1 because a capacity in the inner space, especially a capacity ratio of a first combustion chamber 20 and a second combustion chamber 25 can be adjusted (in the range of 4/6 to 9/1, preferably 1/1 to 8/2 for example), while the height of the gas generator 10 is kept short.

The annular (or cylindrical) first combustion chamber 20 is provided in a space outside the inner cylinder 15, and a first gas generating agent (not shown) is accommodated in the first combustion chamber 20. A gas generating agent having a combustion temperature of 1000 to 1700° C. can be used as the first gas generating agent.

The second combustion chamber 25 is provided in an upper space of the inner cylinder 15, and a second gas generating agent (not shown) is accommodated in the second combustion chamber 25. An ignition means chamber in which two ignition means are accommodated is provided in a lower space of the inner cylinder 15. A gas generating agent having a combustion temperature of 1000 to 1700° C. can be used as the second gas generating agent.

An electric first igniter 31 and a first transfer charge 35 are disposed in a first ignition means chamber. An electric second igniter 32 and a second transfer charge 36 are disposed in a second ignition means chamber. The first igniter 31 and the second igniter 32 are fixed to a single collar 33, and are mounted parallel to each other in the radial direction. When an air bag module including the gas generator 10 is mounted to a vehicle, the first igniter 31 and the second igniter 32 are connected to a power supply (battery) through a connector and a lead wire. A gas generating agent having a combustion temperature of 1700 to 3000° C. can be used as the first and second transfer charges 35 and 36.

A vertical space in the inner cylinder 15, i.e., a space between the second combustion chamber 25, and the first igniter 31 and the second igniter 32 is divided by a flat plate-like partition wall 40 having a skirt portion 41 and a second through hole 52. The flat plate-like partition wall 40 is fitted into the stepped notch 16 of the inner cylinder 15 from the lower side and thus, even when the first igniter 31 is activated, the flat plate-like partition wall 40 is prevented from moving upward by a pressure caused at the time of activation. An inner diameter of the skirt portion 41 is set substantially the same as a diameter of the igniting portion of the igniter 32, and the skirt portion 41 comes into intimate contact with the igniting portion and surrounds the same. Therefore, flame generated by activation of the second igniter 32 moves straight only toward the second through hole 52.

By disposing the flat plate-like partition wall 40 having the skirt portion 41, the second combustion chamber 25 and the two igniters are separated, and the first igniter 31 and the second igniter 32 are separated. Therefore, ignition energy (flame, combustion gas or the like) generated by the activation of the first igniter 31 is prevented from entering the second ignition means chamber and from entering the second combustion chamber 25 through the second through-hole 52.

A first transfer charge 35 charged into an aluminum cap is disposed directly above the first igniter 31. First through holes 51 formed in lower portions of side walls of the inner cylinder 15 bring the first combustion chamber 20 and the first ignition means chamber into communication with each other. Each the first through hole 51 is formed at positions substantially exactly opposite to the center of the first transfer charge 35. The advancing direction of flame generated by the activation of the first igniter 31 is not exactly opposite to the first through hole 51. An aluminum or stainless seal tape 60 is pasted on the first through hole 51 from the inside.

The first through hole 51 and the first transfer charge 35 are exactly opposite to each other in this manner. Thus, when the first igniter 31 is activated, the entire first transfer charge 35 is burnt substantially uniformly.

Further, since the first through-hole 51 is formed in the lower portion of the inner cylinder 15, the ignition energy generated by combustion of the first transfer charge 35 is discharged in the radial direction and then, the direction of the ignition energy is changed to the upward direction and the energy flows out. Therefore, the ignitability of the entire first gas generating agent accommodated in the first combustion chamber 20 is enhanced.

Figure 2:
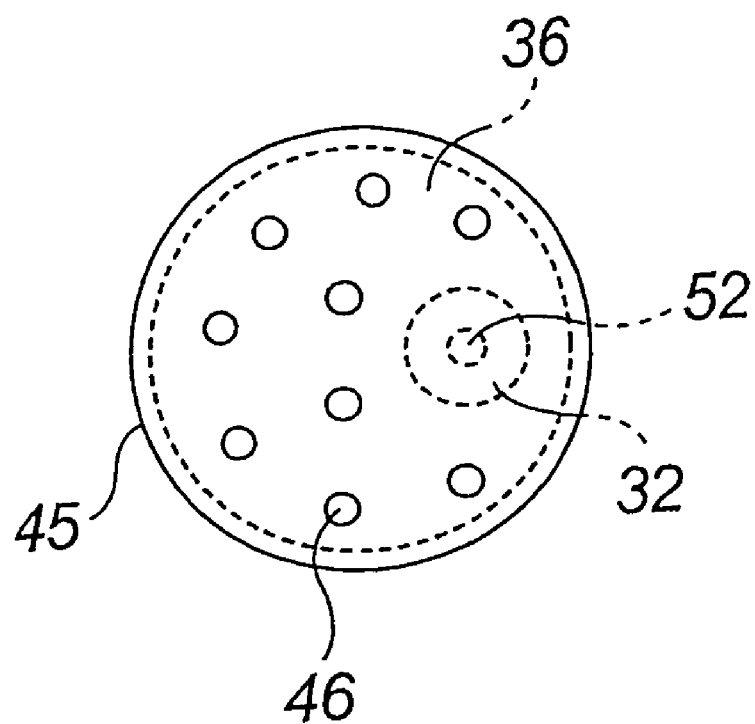
FIG. 2 is a schematic plan view for explaining a layout of a second transfer charge in FIG. 1.

The layout of the second transfer charge 36 will be explained with reference to FIG. 2. FIG. 2 is a plan view showing the layout of the second transfer charge 36.

The second transfer charge 36 is disposed above the second igniter 32 and on the flat plate-like partition wall 40. The second transfer charge 36 is charged into an aluminum cap 46 having a plurality of flame-transferring holes 46. The plurality of flame-transferring holes 46 are not exactly opposite to the advancing direction (directly above the second igniter 32) of flame caused by activation of the second igniter 32.

By setting the positions of the flame-transferring holes 46 in this manner, when the second igniter 32 is activated and the generated flame advances in the directly upper direction, the flame is not discharged from the flame-transferring holes 46 as it is, the second transfer charge 36 is first ignited and burnt, and ignition energy generated by the combustion of the entire second transfer charge 36 is discharged into the second combustion chamber 25 from the flame-transferring holes 46. Therefore, the flammability of the second gas generating agent accommodated in the second combustion chamber 25 is enhanced.

Figure 3:
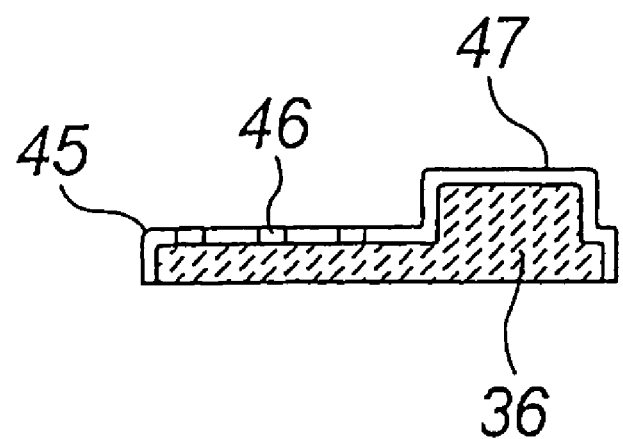
FIG. 3 is a schematic sectional view of another embodiment shown in FIG. 2.

As shown in FIG. 3, the aluminum cap 45 in which the second transfer charge 36 is charged may have a projection 47 directly above the second igniter 32. If the aluminum cap 45 includes the projection 47, the charging amount of the second transfer charge 36 can be increased, and thereby, the ignitability of the second gas generating agent is further enhanced. Even in the aspect shown in FIG. 3, the aluminum cap 45 is provided at its flat surface except the projection 47 with the flame-transferring holes 46.

A bottomed cylindrical retainer 55 is fitted into the second combustion chamber 25 such that an opening of the retainer 55 is directed downward, and an inner wall 25*a* of the second combustion chamber 25 is pushed in the side wall tip end 55*a* so that the retainer 55 is fixed. A gap 57 is provided between a side wall of the retainer 55 and the inner wall 25*a* of the second combustion chamber 25. The gap 57 has such a size that a gas passage can be secured.

The retainer 55 is provided at its side wall with a plurality of openings 56 (nozzles). The height of the openings 56 in the axial direction is higher than the height of a third through-hole 53 formed in the inner cylinder 15.

The third through hole 53 is closed by a stainless seal tape 58 from the outside, and the openings 56 may be closed with aluminum or stainless seal tapes 80 from the inside. Having the opening 56 closed by a stainless seal tape, the inner pressure of the second combustion chamber 25 is temporally increased when the first and second combustion chambers 20 and 25 start combustion at the same time due to simultaneous activation of the two igniters. Thereby, the ignitability of the second gas generating agent is improved.

Since the gap 57 is provided between the side wall of the retainer 55 and the inner wall 25*a* of the second combustion chamber 25, the third through-hole 53 is prevented from being closed with the second gas generating agent. If the third through-hole 53 is closed by the second gas generating agent, the inner pressure of the second combustion chamber 25 increases excessively. When the second gas generating agent closing the third through-hole 53 is burnt, the inner pressure is dropped rapidly because of the opened third through-hole 53, which may disturb stable combustion.

By adjusting heights of the openings 56 and the third through-hole 53, even if the third through-hole 53 is located at lower sides of the second combustion chamber 25 as shown in FIG. 1, a gas generated by combustion of the second gas generating agent passes through the openings 56 located at upper sides of the second combustion chamber 25 and then is discharged from the third through-hole 53. Therefore, flame well runs in the second combustion chamber 25 entirely, and the flammability of the second gas generating agent is enhanced.

The total opening area of the third through-hole 53 is set smaller than the total opening area of the openings 56, and is set smaller than the total opening area of the gas discharging holes 17 and 18.

When the first igniter 31 is first activated and the second igniter 32 is activated later, that is, when the first gas generating agent in the first combustion chamber 20 is first burnt and the second gas generating agent in the second combustion chamber 25 is burnt with a delay, the pressure in the second combustion chamber 25 becomes sufficiently higher than the pressure in the first combustion chamber 20. For this reason, by setting the total opening area of the third through-hole 53 as described above, the flow-out speed of the combustion gas from the second combustion chamber is controlled by the third through-hole 53 and thus, the internal pressure in the second combustion chamber 25 at the time of combustion is also controlled by the third through hole 53. Thus, the combustion state in the second combustion chamber 25 is controlled by the third through-hole 53. When the first igniter 31 and the second igniter 32 are activated at the same time, a difference in pressure between the first combustion chamber 20 and the second combustion chamber 25 becomes small and thus, the internal pressure in the second combustion chamber 25 is still higher, but the influence of pressure control by the third through-hole 53 becomes small.

By controlling the combustion state of the second combustion chamber 25 by the third through-hole 53, the following effect can be obtained.

In the case of an automobile colliding at a low speed, when only the first igniter 31 is ignited to burn only the first gas generating agent, the remaining unburned second gas generating agent becomes dangerous at the time of scrapping the automobile. For this reason, the second igniter 32 is activated after the activation of the first igniter 31 by 100 milliseconds to ignite and burn the second gas generating agent in some cases. In such a case, if the combustion state of the second combustion chamber 25 can be controlled by the third through-hole 53, it is preferable that the ignitability and flammability of the second gas generating agent is enhanced and NOx or the like is restrained from being generated. Besides, if the generation time of the combustion gas from the second combustion chamber 25 is elongated, such a requirement to elongate the inflation-maintaining time of the air bag can also be satisfied.

A cylindrical filter 65 is disposed between the first combustion chamber 20 and a peripheral wall of the housing 11 (diffuser shell peripheral wall 12*b* and closure shell peripheral wall 13*b*) to remove combustion residue from the combustion gas and cool the combustion gas.

The cylindrical filter 65 can be one obtained by winding cylindrically a metal thin wire (such as an iron wire) having a wire diameter of about 0.3 to 1.2 mm, one obtained by plain-weaving and winding many times the thin wire and compression-molding the same, one obtained by winding a plain woven wire mesh, a plain dutch wire mesh or a twilled dutch wire mesh each having a wire diameter of 0.3 to 0.8 mm, or by winding a combination thereof, or one obtained by interposing ceramic fiber or metal fiber between the above wire mesh.

A structure of the cylindrical filter is appropriately selected in accordance with a kind of a gas generating agent to be used (depending upon the combustion temperature and the amount of combustion residue to be produced). For example, when a gas generating agent having a low combustion temperature (about 1000 to 1700° C.) and producing a small amount of combustion residue is used, a filter having a bulk density of 1 to 5 g/cm³, preferably 2 to 3 g/cm³ and thickness of 3 to 10 mm, preferably 3 to 6 mm can be used.

An inner cylindrical shielding plate 66 is disposed inside the cylindrical filter 65. A gap (first gap 71) is provided between the cylindrical filter 65 and the inner cylindrical shielding plate 66. In this case, instead of the gap, part of the inner cylindrical shielding plate 66 which contacts the cylindrical filter 65 (in almost the same width as the gap) can be formed to have a coarse structure to virtually make the same condition as the gap is provided. The coarse structure contracts with the dense structure of the remaining part. When the bulk density of the dense structure is in the above range, a bulk density of the coarse structure can be in the range of 0.1 to 1.0 g/cm³.

A width of each of the gap and the coarse structure is preferably 0.5 to 3 mm, and more preferably 1 to 2 mm.

An outer cylindrical shielding plate 67 is disposed at an outer side of the cylindrical filter 65 in a state in which the outer cylindrical shielding plate 67 is in contact with an outer peripheral surface of the cylindrical filter 65. A gap (second gap 72) is provided between the outer cylindrical shielding plate 67 and a peripheral wall of the housing 11. It is preferable that the width of the second gap 72 is set wider than that of the first gap 71.

The inner cylindrical shielding plate 66 and the outer cylindrical shielding plate 67 do not cover the entire surface of the cylindrical filter 65 as shown in FIG. 1.

Figure 7:
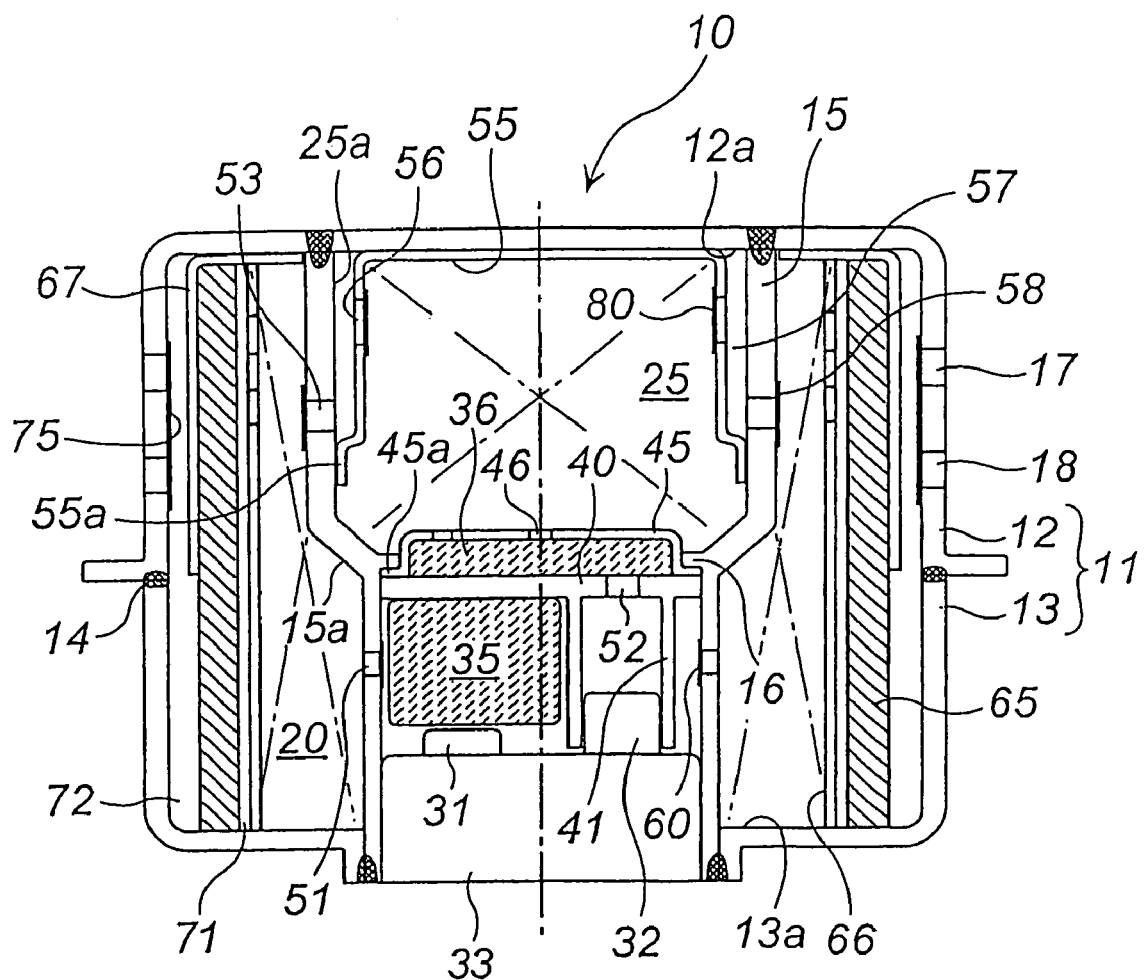
FIG. 7 is an axial sectional view of an alternative example of the gas generator shown in FIG. 1.

The inner cylindrical shielding plate 66 covers a lower portion of the cylindrical filter 65 (in the height range of about ½ to ⅔ of the entire height of the cylindrical filter 65) in a state in which one end peripheral edge abuts against the bottom surface 13a. The same state as shown in FIG. 1 may be obtained by first covering the entire inner peripheral surface of the filter 65 with the inner cylindrical shielding plate 66 and providing at a portion of the filter 65 with a plurality of vent holes as shown in FIG. 7.

The outer cylindrical shielding plate 67 covers an upper portion of the cylindrical filter 65 (in the height range of about ½ to ⅔ of the entire height of the cylindrical filter 65) in a state in which one end peripheral edge abuts against the ceiling surface 12a. The same state as shown in FIG. 1 may be obtained by first covering the entire outer peripheral surface of the filter 65 with the outer cylindrical shielding plate 67 and providing at a portion of the filter 65 with a plurality of vent holes.

By disposing the cylindrical filter 65, the inner cylindrical shielding plate 66 and the outer cylindrical shielding plate 67 in this manner, the filtering effect (filtering of the combustion residue) and cooling effect of the combustion gas are further enhanced.

The seal tapes 75 which close the gas discharge ports 17 and 18 can be set to be ruptured at the same time or only some portions covering the gas discharge ports 17 and 18 may be ruptured, depending upon the activation state of the igniters (only one of the igniters is activated, or both igniters are activated at the same time or the igniters are activated with a time lag).

Next, the operation when the two igniters are activated with a time lag in the gas generator 10 for an air bag will be explained.

When the first igniter 31 is activated, the transfer charge 35 is ignited and burnt, the ignition energy ruptures the seal tape 60 and the ignition energy passes through the first through-hole 51 and discharged into the first combustion chamber 20. At that time, the ignition energy is discharged in the radial direction and then is moved in the first combustion chamber 20 upward. Therefore, the ignitability and the flammability of the first gas generating agent are excellent. Since the third through-hole 53 is closed with the stainless seal tape 58, the combustion gas in the first combustion chamber 20 does not flow into the second combustion chamber 25.

Figure 4:
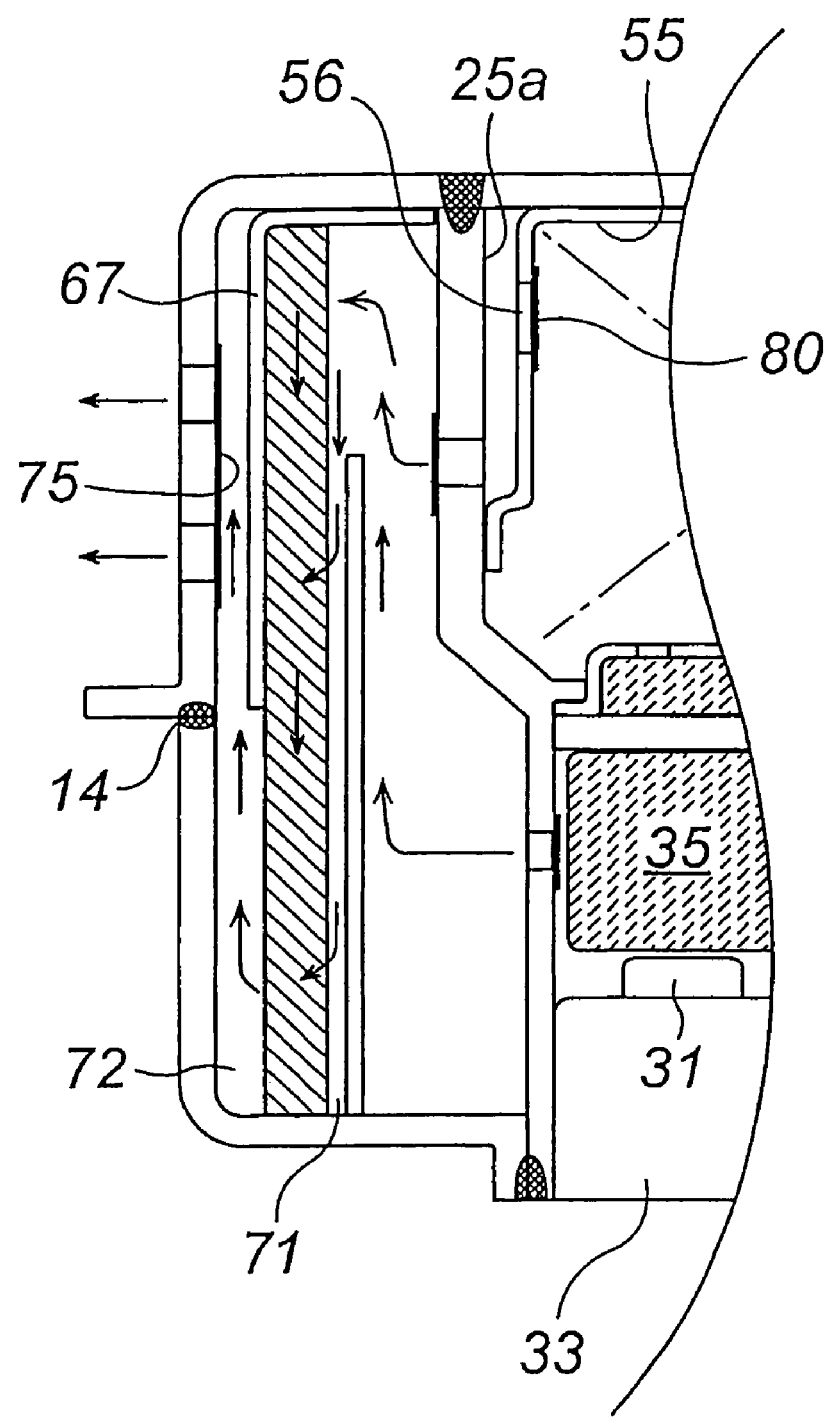
FIG. 4 is a conceptional view for explaining an outflow state of a combustion gas.

The combustion gas generated in the first combustion chamber 20 (and ignition energy generated by the first ignition means) as well as the combustion gas generated by the second combustion chamber 25 are moved in the flow as shown with the arrows in FIG. 4.

The ignition energy discharged from the first through-hole 51 formed in the peripheral wall of the inner cylinder 15 collides against the inner cylindrical shielding plate 66 which is exactly opposes the first through hole 51. Thus, the advancing direction of the ignition energy is changed into the upward direction and ignites and burns the gas generating agent existing in the subsequent advancing direction. That is, the advancing direction of the ignition energy is changed from the radial direction into the axial direction by the inner cylindrical shielding plate 66, and the ignition energy is supplied to the gas generating agents existing in both the radial direction and the axial direction. Thus, the ignitability and the flammability of the entire first gas generating agent existing in the first combustion chamber 20 are enhanced.

Meanwhile, when the inner cylindrical shielding plate 66 does not exist, the ignition energy discharged radially outward from the first through hole 51 is sufficiently supplied to the first gas generating agent existing in the discharging direction but is less prone to be transmitted to the gas generating agent located upward. This problem remarkably appears when a gas generating agent having poor ignitability is used, but if the inner cylindrical shielding plate 66 is used as described above, this problem does not occurs.

Further, if the inner cylindrical shielding plate 66 is used, it is possible to prevent the ignition energy from colliding against a portion of the cylindrical filter 65 and to prevent the cylindrical filter 65 from being damaged. To obtain this effect, the position of the first through hole 51 in the axial direction is adjusted.

The combustion gases generated in the first combustion chamber 20 enter the cylindrical filter 65 from a portion (or vent hole) which is not covered with the inner cylindrical shielding plate 66, a portion of the gas moves in the cylindrical filter 65 in the axial direction as it is and then, reaches the second gap 72. The remaining portion of the combustion gas passes through the first gap 71 and moves, and passes through the cylindrical filter 65 in the radial direction and reaches the second gap 72. Then, the combustion gas ruptures a portion or all of the seal tape 75, and is discharged from a portion or all of the gas discharge ports 17 and 18 to inflate the air bag.

By allowing the combustion gas to pass through the first gap 71 in this manner, the combustion gas can pass through the cylindrical filter 65 in the axial direction, the entire cylindrical filter 65 can be used, a long contact time between the combustion gas and the cylindrical filter 65 can be secured and thus, the cooling and filtering effects of the combustion gas can be enhanced.

After a slight time lag, the second igniter 32 is activated. At that time, the flame advances through the second through-hole 52, but, since the advancing direction of the flame and the flame-transferring holes 46 do not exactly oppose each other, the ignition energy is discharged into the second combustion chamber 25 from the flame-transferring holes 46 after all the second transfer charge 36 charged into the aluminum cup 45 is ignited and burnt.

When the ignition energy enters the second combustion chamber 25, the second gas generating agent in the second combustion chamber 25 is ignited and burnt. Since the height positions of the openings 56 of the retainer 55 and the third through-hole 53 are adjusted as described above, the flame runs through the entire second combustion chamber 25 excellently, and the ignitability and the flammability of the second gas generating agent are excellent. Further, when the openings 56 are closed with the seal tapes 80, the initial flammability of the second gas generating agent is enhanced.

A gas generated in the second combustion chamber 25 is discharged from the third through-hole 53 in the radial direction and flows into the first combustion chamber 20 and then, the gas is cooled and filtered through the cylindrical filter 65 and discharged from the gas discharge ports 17 and 18 in the above-described manner to further inflate the air bag.

(2) Second Embodiment

Figure 5:
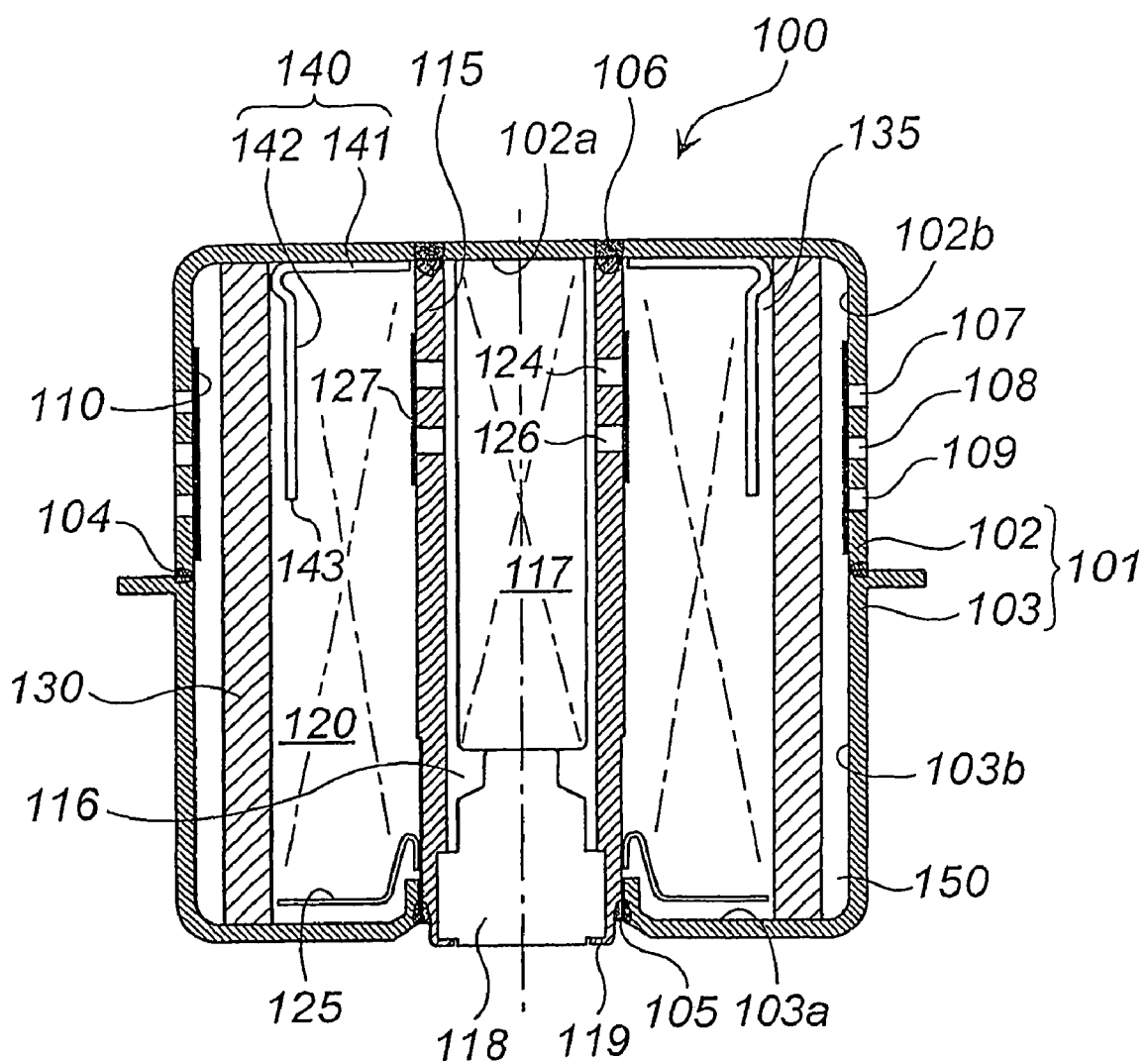
FIG. 5 is an axial sectional view of a gas generator for an air bag according to another embodiment.
Figure 6:
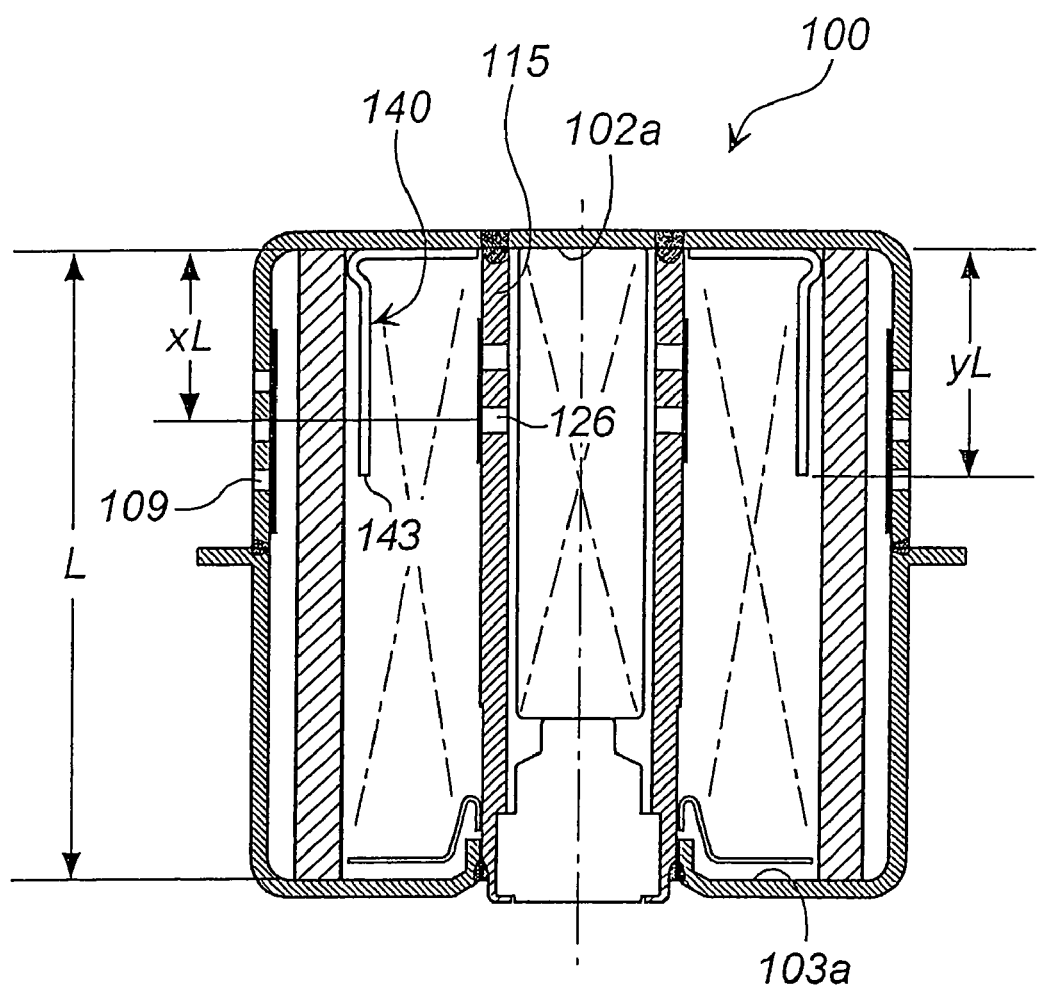
FIG. 6 is a view for explaining a positional relationship between a communication hole and an inner cylindrical shielding plate in FIG. 5.

Another embodiment of the present invention will be explained with reference to the drawings. FIG. 5 is an axial sectional view of the gas generator for an air bag. FIG. 6 is a view for explaining a positional relationship of constituent elements shown in FIG. 5. In the following description, "the axial direction" means the axial direction of a housing, and "the radial direction" means the radial direction of the housing.

The gas generator 100 for an air bag is formed with an outer shell container formed of a housing 101. The housing 101 is formed by joining a diffuser shell 102 and a closure shell 103 with each other. The diffuser shell 102 and the closure shell 103 form an inner accommodating space. The diffuser shell 102 and the closure shell 103 are welded at a welding portion 104.

The diffuser shell 102 is provided with a necessary number of gas discharge ports 107, 108 and 109, and the ports are closed with aluminum seal tapes 110 for preventing moisture. Diameters of the gas discharge ports 107, 108 and 109 may be the same or different.

A substantially cylindrical inner cylinder 115 is disposed in the housing 101. An upper end edge of the inner cylinder 115 is welded and fixed to a ceiling surface 102a of the diffuser shell 102 at a welding portion 106, and a lower end edge of the inner cylinder 115 is inserted into an opening of a bottom surface 103a of the closure shell 103, and welded and fixed by a welded portion 105 so that inner and outer spaces are separated from each other.

A cylindrical combustion chamber 120 is provided in an outer space of the inner cylinder 115, and a gas generating agent (not shown) is accommodated therein. A gas generating agent having a combustion temperature of 1000 to 1700° C. can be used as the gas generating agent. A retainer 125 adjusts a capacity of the combustion chamber 120 in accordance with an amount of the gas generating agent.

An inner space of the inner cylinder 115 is an ignition means chamber 116. A transfer charge 117 charged into an aluminum cup and an electric igniter 118 are disposed in the ignition means chamber 116. The igniter 118 is fixed by cramping an opening peripheral edge 119 of the inner cylinder 115. A gas generating agent having a combustion temperature of 1700 to 3000° C. can be used as the transfer charge 117. When an air bag module including the gas generator 100 is mounted to a vehicle, the igniter 118 is connected to a power supply (battery) through a connector and a lead wire.

An upper portion of a peripheral wall of the inner cylinder 115 (in the vicinity of end portion opposite to the mounting position of the igniter 118) is provided with a necessary number of communication holes 124 and 126 which bring the ignition means chamber 116 into communication with the combustion chamber 120. The communication holes 124 and 126 are closed with aluminum seal tapes 127, but if a seal is secured between the electric igniter 118 and the inner cylinder 115, the seal tapes 127 are unnecessary.

A cylindrical filter 130 is disposed between the combustion chamber 120 and a peripheral wall of the housing 101 (between a diffuser shell peripheral wall 102b and a closure shell peripheral wall 103b). The cylindrical filter 130 removes the combustion residue and cools the combustion gas. The same cylindrical filter as that shown in FIG. 1 can be used as the cylindrical filter 130.

An inner cylindrical shielding plate 140 is disposed inside the cylindrical filter 130. A gap (first gap 135) is provided between the cylindrical filter 130 and the inner cylindrical shielding plate 140. The first gap 135 serves as a portion having air permeability. Instead of providing the gap 135, part of the cylindrical filter 130 that contacts with the inner cylindrical shielding plate 140 (in the same width as the gap 135) can be formed to have a coarse structure, thereby providing the same state in which the gap 135 is virtually provided. A width of the gap and a width of the coarse structure portion may be the same as those shown in FIG. 1.

The inner cylindrical shielding plate 140 may be the same as the inner cylindrical shielding plate 66 shown in FIG. 1. In this embodiment, the inner cylindrical shielding plate 140 comprises an annular bottom surface 141 and an annular peripheral wall 142 provided vertically with the annular bottom surface 141. It is preferable that an outer diameter of the annular bottom surface 141 is greater than an outer diameter of the annular peripheral wall 142. In FIG. 5, a width of the annular bottom surface 141 (difference between a diameter of an outer circumference and a diameter of an inner circumference) and a distance between the cylindrical filter 130 and the inner cylinder 115 in the radial direction are set substantially equal to each other.

If the inner cylindrical shielding plate 140 comprising the annular bottom surface 141 and the annular peripheral wall 142 is used as the inner cylindrical shielding plate 140, it becomes easy to mount the inner cylindrical shielding plate 140 and easy to form the first gap 135.

The inner cylindrical shielding plate 140 is disposed such that the annular bottom surface 141 is in contact with a housing ceiling surface 102a and an outer peripheral edge of the annular bottom surface 141 abuts against an inner peripheral surface of the cylindrical filter 130. The inner cylindrical shielding plate 140 may also be disposed such that the annular bottom surface 141 comes into contact with the housing bottom surface 103a in accordance with positions of the communication holes 124 and 126, the gas discharge ports 107 or the like.

It is preferable that, if a height (distance) from the housing ceiling surface 102a to the bottom surface 103a is defined as L, a relationship between a position xL of the communication hole 126 provided in the peripheral wall of the inner cylinder 115 in the axial direction of the housing and a position yL of the inner cylindrical shielding plate 140 (tip end 143) satisfies both the following conditions (a) and (b), and preferably, it also satisfies (c). Also when the annular bottom surface 141 is disposed such that it comes into contact with the housing bottom surface 103a, the same relationship is satisfied:

(a) "x" in xL is 0.05 to 0.6, "y" in yL is 0.3 to 0.8 (here, x is determined based on a center of the communication hole 126).

(b) the communication hole 126 and the inner cylindrical shielding plate 140 exactly oppose each other. That is, a relationship of xL<yL (=x<y) is satisfied. Here, x is determined based on the center of the communication hole 126, but it is preferable that the tip end 143 is lower than any position of the opening of the lowest communication hole 126.

(c) a straight line connecting centers of the gas discharge ports 107, 108 and 109 and centers of the communication holes 124 and 126 is shielded by the inner cylindrical shielding plate 140.

If the conditions (a) and (b) are satisfied, the following effect can be obtained. The igniter 118 is activated and then the transfer charge 117 is ignited and burnt, thereby generating ignition energy. When the ignition energy is discharged from the communication holes 124 and 126, the ignition energy absolutely comes into contact with the cylindrical filter 130 after the ignition energy collides against the cylindrical filter 130. Therefore, since the ignition energy does not intensively collide against the cylindrical filter 130 and thus, the cylindrical filter 130 is not damaged and its function is not deteriorated.

The advancing direction of the ignition energy which has collided against the inner cylindrical shielding plate 140 is changed into the downward direction (opposite from the direction shown in FIG. 4), the ignition energy ignites and burns the gas generating agent existing in the subsequent advancing direction, and the ignitability and flammability of the entire amount of gas generating agent are enhanced like the gas generator 10 shown in FIG. 1.

When the communication holes 124 and 126 and the gas discharge ports 107, 108 and 109 are disposed on substantially the same plane as shown in FIG. 5, and when there is no inner cylindrical shielding plate 140, the ignition energy is discharged outside the housing 101 from the gas discharge ports 107, 108 and 109 at a time and thus, the gas generating agent is not ignited excellently. However, if the condition (c) is satisfied, this problem is not occurred.

The second gap 150 is provided between the cylindrical filter 130 and the housing peripheral wall (between the diffuser shell peripheral wall 102b and the closure shell peripheral wall 103b).

In the gas generator 100 shown in FIG. 5, the same plate as the outer cylindrical shielding plate 67 shown in FIG. 1 can be disposed. In that case, like the structure shown in FIG. 1, the filtering and cooling functions by the cylindrical filter 130 are enhanced. When the outer cylindrical shielding plate is disposed, it is disposed such that one end opening peripheral edge of the plate comes into contact with the housing bottom surface 103a, the other end opening peripheral edge is disposed with a gap between itself and the housing ceiling surface 102a, and a gap 150 is generated between itself and the housing peripheral wall having the gas discharge ports 107, 108 and 109.

The invention claimed is:

1. A gas generator for an air bag, comprising:
a housing having a gas discharge port;
an ignition means chamber accommodating therein ignition means activated by an impact;
a combustion chamber accommodating therein a gas generating agent ignited and burnt to generate a combustion gas;
a cylindrical filter disposed between the combustion chamber and the gas discharge port, in which the combustion gas passes through the filter and is discharged from the gas discharge port; and
an inner cylindrical shielding plate disposed inside the cylindrical filter,
wherein, the inner cylindrical shielding plate is disposed such that its lower end opening peripheral edge is in contact with a housing bottom surface and defines an opening between an upper end of the inner cylindrical shielding plate and a ceiling of the housing that allows the combustion gas to flow from the combustion chamber to the cylindrical filter, and a gap is provided between an inner peripheral surface of the cylindrical filter and an outer peripheral surface of the inner cylindrical shielding plate.

2. A gas generator for an air bag, comprising:
a housing having a gas discharge port;
an ignition means chamber accommodating therein ignition means activated by an impact;
a combustion chamber accommodating therein a gas generating agent ignited and burnt to generate a combustion gas;
a cylindrical filter disposed between the combustion chamber and the gas discharge port, in which the combustion gas passes through the filter and is discharged from the gas discharge port; and
an inner cylindrical shielding plate and an outer cylindrical shielding plate respectively disposed inside and outside the cylindrical filter,
wherein, the inner cylindrical shielding plate is disposed such that its lower end opening peripheral edge is in contact with a housing bottom surface and defines, between an upper end opening peripheral edge of the inner cylindrical shielding plate and a housing ceiling surface, a portion having excellent air permeability is provided between an inner peripheral surface of the cylindrical filter and the inner cylindrical shielding plate, and
wherein, the outer cylindrical shielding plate is disposed such that its upper end opening peripheral edge is in contact with the housing ceiling surface, a space is provided between the housing bottom surface and a lower end opening peripheral edge of the outer cylindrical shielding plate, and a gap is formed between the outer cylindrical shielding plate and a housing peripheral wall having the a gas discharge port.

3. A gas generator for an air bag according to claim 1 or 2, wherein the inner cylindrical shielding plate extend substantially along an entire length of the inner peripheral surface of the cylindrical filer, and the upper end opening peripheral edge side of the inner cylindrical shielding plate has a vent hole.

4. A gas generator for an air bag according to claim 2, wherein the outer cylindrical shielding plate is disposed such that its upper end opening peripheral edge is in contact with the housing ceiling surface and the lower end opening peripheral edge of the outer cylindrical shielding plate is in contact with the housing bottom surface, the lower end opening peripheral edge side of the outer cylindrical shielding plate has a vent hole, and a gap is formed between the housing peripheral wall having the a gas discharge port and the outer cylindrical shielding plate.

5. A gas generator for an air bag, comprising:
a housing having a gas discharge port;
an ignition means chamber accommodating therein ignition means activated by an impact;

a combustion chamber accommodating therein a gas generating agent ignited and burnt to generate a combustion gas;

a cylindrical filter disposed between the combustion chamber and the gas discharge port, in which the combustion gas passes through the filter and is discharged from the gas discharge port;

an inner cylinder disposed in a central portion of the housing, the inner cylinder defining therein an ignition means chamber, the ignition means chamber and the combustion chamber being in communication with each other through a communication hole formed in a peripheral wall of the inner cylinder;

an inner cylindrical shielding plate disposed inside the cylindrical filter, an upper end opening peripheral edge of the inner cylindrical shielding plate being in contact with a housing ceiling surface and a combustion gas pass between the lower end opening peripheral edge and a housing bottom surface, or the lower end opening peripheral edge of the inner cylindrical shielding plate being in with the housing bottom surface and the combustion gas pass between the upper end opening peripheral edge and the housing ceiling surface, a gap is provided between an inner peripheral surface of the cylindrical filter and an outer peripheral surface of the inner cylindrical shielding plate; and a communication hole formed in the peripheral wall of the inner cylinder and facing the inner cylindrical shielding plate.

6. A gas generator for an air bag according to claim 5, wherein when an upper end opening peripheral edge of the inner cylindrical shielding plate is in contact with a housing ceiling surface and a space is formed between the lower end opening peripheral edge and the housing bottom surface, or when the upper end opening peripheral edge of the inner cylindrical shielding plate is in contact with the housing ceiling surface and the lower end opening peripheral edge is in contact with the housing bottom surface and plural vent holes are formed in the lower end opening peripheral edge, a relationship between a position of a communication hole, which is formed in the peripheral wall of the inner cylinder, in an axial direction of the housing and a position of a tip end of the inner cylindrical shielding plate or a position of the vent hole is set such that if a height from the housing ceiling surface to the housing bottom surface is defined as L, the communication hole is formed in a peripheral wall of the inner cylinder in the range of 0.05 L to 0.6 L from the housing ceiling surface, the position of the tip end of the inner cylindrical shielding plate or the forming position of the vent hole exists in the range of 0.3 L to 0.8 L from the housing ceiling surface, and the communication hole and the inner cylindrical shielding plate exactly oppose each other.

7. A gas generator for an air bag according to claim 5, wherein when the lower end opening peripheral edge of the inner cylindrical shielding plate is in contact with the housing bottom surface and a space is generated between the housing ceiling surface and the upper end opening peripheral edge of the inner cylindrical shielding plate, or when the lower end opening peripheral edge of the inner cylindrical shielding plate is in contact with the housing bottom surface and the upper end opening peripheral edge of the inner cylindrical shielding plate is in contact with the housing ceiling surface and plural vent holes are formed in the upper end opening peripheral edge, a relationship between a forming position of the communication hole, which is formed in the peripheral wall of the inner cylinder, in the axial direction of the housing and a position of the tip end of the inner cylindrical shielding plate or the forming position of the vent hole is set such that if a height from the housing bottom surface to the housing ceiling surface is defined as L, the communication hole is formed in the inner cylinder peripheral wall in the range of 0.05 L to 0.6 L from the housing bottom surface, the position of the tip end of the inner cylindrical shielding plate or the forming position of the vent hole exists in the range of 0.3 L to 0.8 L from the housing bottom surface, the communication hole and the inner cylindrical shielding plate face each other.

8. A gas generator for an air bag according to any one of claims 1, 2 and 5, wherein the inner cylindrical shielding plate comprises an annular bottom surface and an annular peripheral wall provided vertically with the annular bottom surface, an outer diameter of the annular bottom surface is set greater than an outer diameter of the annular peripheral wall, the annular bottom surface is in contact with the housing ceiling surface or the housing bottom surface, an inner peripheral edge of the annular bottom surface abuts against the inner cylinder peripheral wall, or an outer peripheral edge of the annular bottom surface abuts against an inner peripheral surface of the cylindrical filter.

9. A gas generator for an air bag according to claim 5 or 6, wherein an outer cylindrical shielding plate is disposed outside the cylindrical filter, one end opening peripheral edge of the outer cylindrical shielding plate is in contact with the housing ceiling surface or the housing bottom surface, the other end opening peripheral edge is disposed at a distance from the housing bottom surface or the housing ceiling surface, and a gap is formed between the outer cylindrical shielding plate and the housing peripheral wall having the a gas discharge port.

10. A gas generator for an air bag according to claim 5 or 6, wherein an outer cylindrical shielding plate is further disposed outside the cylindrical filter, one end opening peripheral edge of the outer cylindrical shielding plate is in contact with the housing ceiling surface or the housing bottom surface, the other end opening peripheral edge of the outer cylindrical shielding plate is in contact with the housing bottom surface or the housing ceiling surface, the other end opening peripheral edge has a vent hole, a gap is formed between the outer cylindrical shielding plate and the housing peripheral wall having the gas discharge port.

11. A gas generator for an air bag according to any one of claims 1, 2 and 5, wherein a portion having air permeability provided between an inner peripheral surface of the cylindrical filter and an inner cylindrical shielding plate is a cylindrical space provided between the inner peripheral surface of the cylindrical filter and the inner cylindrical shielding plate or a coarse structure of the cylindrical filter.

12. A gas generator for an air bag according to any one of claims 1, 2 and 5, wherein
a bulk density of the cylindrical filter is 1 to 5 g/cm$^3$, and a thickness of the cylindrical filter is 3 to 10 mm.

13. A gas generator for an air bag according to any one of claims 1, 2 and 5, wherein
a width of the portion having excellent air permeability provided between a surface of the cylindrical filter and the inner cylindrical shielding plate is 0.5 to 3 mm.

14. A gas generator for an air bag according to any one of claims 1, 2 and 5, wherein
the ignition means comprises an electric igniter which is activated by igniting current and a transfer charge which is ignited by activation of the electric igniter, a gas generating agent having a combustion temperature of 1000 to 3000° C. is used as the transfer charge, and a gas generating agent having a combustion temperature of 1000 to 1700° C. is used as the gas generating agent for inflating the air bag, which is disposed in the combustion chamber.

* * * * *